United States Patent [19]
Yamamoto

[11] Patent Number: 5,826,675
[45] Date of Patent: Oct. 27, 1998

[54] ELECTRIC MOTOR ASSISTED VEHICLE

[75] Inventor: Satoshi Yamamoto, Iwata, Japan

[73] Assignee: Yamaha Hatsudoki Kabushiki Kaisha, Iwata, Japan

[21] Appl. No.: 888,575

[22] Filed: Jul. 7, 1997

[30] Foreign Application Priority Data

Jul. 5, 1996 [JP] Japan .................................. 8-176229

[51] Int. Cl.⁶ ................................................. B60K 1/00
[52] U.S. Cl. .......................................... 180/220; 180/287
[58] Field of Search .................................... 180/219, 220, 180/223, 224, 216, 65.1, 65.2, 65.3, 65.4, 65.5, 65.6, 287, 282

[56] References Cited

U.S. PATENT DOCUMENTS

| | | | |
|---|---|---|---|
| 3,713,502 | 1/1973 | Delaney et al. | 180/216 |
| 4,183,418 | 1/1980 | Dudas | 180/216 |
| 5,474,148 | 12/1995 | Tokata | 180/220 |
| 5,662,187 | 9/1997 | McGovern | 180/220 |
| 5,704,441 | 1/1998 | Li | 180/220 |

FOREIGN PATENT DOCUMENTS

| | | |
|---|---|---|
| 590674 | 4/1994 | European Pat. Off. . |
| 650888 | 5/1995 | European Pat. Off. . |
| WO 9117078 | 11/1991 | WIPO . |

*Primary Examiner*—Richard M. Camby
*Attorney, Agent, or Firm*—Knobbe, Martens, Olson & Bear LLP

[57] ABSTRACT

A security system for an electric motor assisted vehicle wherein the vehicle power unit has a controller that is preprogrammed with certain identifying data. The controller is not operative to provide electric power assist unless utilized with a security unit that has matching data. The security unit also can contain vehicle specific information for providing the operator-selected type of power assist.

11 Claims, 8 Drawing Sheets

ELECTRIC MOTOR ASSISTED VEHICLE

BACKGROUND OF THE INVENTION

This invention relates to an electric motor assisted vehicle and more particularly to an improved security system for such a vehicle.

There is considerable interest in a type of vehicle that is designed to be powered primarily manually from the rider. However, in order to broaden the utilization of such vehicles, electric motor assist is also incorporated. The electric motor assist is preferably operated so that the assist from the electric motor only supplements the manual input from the operator. That is, the operator cannot run the vehicle under electric power only.

The way this is normally done is to employ a torque sensor in the drive system that senses the manual input force. By some form of control strategy, the electric motor assist is related to the input force so that a force must be input manually before any electric power assist can be operated.

For a variety of reasons, it is also preferable to limit the total electric motor assist that may be accomplished. One way this is done is by decreasing the electric motor assist ratio as the speed of the vehicle increases. This will ensure that the vehicle cannot be driven at too high a speed through utilization of the electric motor assist.

A vehicle of this type is disclosed in U.S. Pat. No. 5,570,752 issued Nov. 5, 1996 and assigned to the assignee hereof. Although that patent specifically depicts the application of the principle to a bicycle, it will be readily apparent that this concept can be used with a wide variety of types of vehicles either land or water.

It should also be readily apparent that the control strategy will depend to a large extent on the physical characteristics of the vehicle and also those of the rider. Obviously, older and/or physically challenged people may require greater power assist than younger, more vigorous people. Furthermore, the specific nature of the vehicle may demand different performances. For example, with bicycles the rider may specify different pedal lengths, different wheel diameters and/or different transmission ratios. All of these factors need to be accommodated in the control strategy.

This presents a number of problems from a manufacturing and servicing standpoint. If the drive unit and/or controller are each modified so as to accommodate all of these variations, then a wide number of components must be stocked by the manufacturer and/or its servicing and distribution agency.

Also, the wire harnesses which connect the control unit and the drive unit may also be quite different. Furthermore, there is a danger that a user may substitute a different control unit and one which is incompatible with the power unit.

It is, therefore, a principal object of this invention to provide an improved control arrangement for an electric motor assisted vehicle.

It is a further object of this invention to provide an electric motor assisted vehicle wherein the controller and drive unit may be designed so as to suit the varying needs of the various customers and also the variations in the vehicle with which it will be applied.

It is a further object of this invention to provide improved security control system for such a vehicle so that the vehicle will not be operated in the power mode unless the appropriate components are interrelated.

SUMMARY OF THE INVENTION

This invention is adapted to be embodied in an electric power assisted vehicle that has a drive unit that consists of a manually input force device and an electric motor power assist. These force applications are combined in a transmission having an output for driving the vehicle. A control unit is provided for controlling the electric motor in response to sensed conditions for controlling the amount of electric motor assist in response to those conditions. A separate encoded security unit is provided on the vehicle and cooperates with the control unit so as to provide specific data for the control unit to identify that the correct encoded security unit is in place and to provide the appropriate control data for the specific vehicle and its user.

DETAILED DESCRIPTION OF THE PREFERRED EMBODIMENTS OF THE INVENTION

Figure 1:
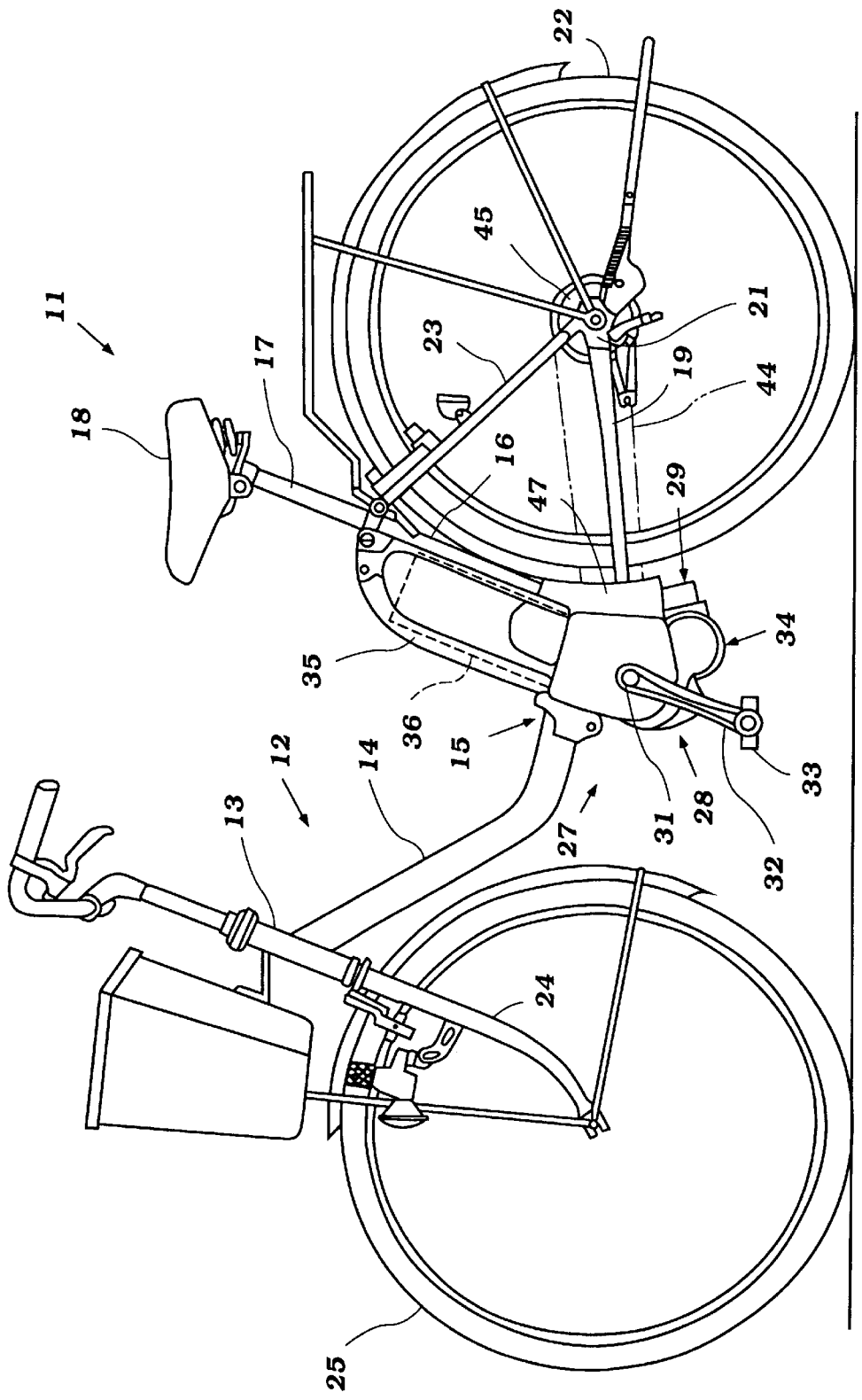
FIG. 1 is a side elevational view of an electric motor assisted, manually operated vehicle constructed in accordance with an embodiment of the invention.

Referring now in detail to the drawings and initially primarily to FIGS. 1–4, an electric motor assisted, manually power operated vehicle constructed in accordance with the invention is identified generally by the reference numeral 11. The vehicle 11 is, in the illustrated embodiment, a bicycle. For reasons noted above, however, the invention may be utilized with a wide variety of other types of vehicles. A bicycle is illustrated because it is a typical type of vehicle with which such assisted power units are employed.

The bicycle 11 is comprised of a frame assembly, indicated generally by the reference numeral 12. The frame assembly 12 is of the welded up type and includes a head pipe 13 from which a down tube 14 extends. The down tube 14 extends downwardly and rearwardly and turns to a horizontal direction where it terminates at a bracket assembly 15. The bracket assembly 15 interconnects the down tube 14 with a seat tube 16. A seat post 17 is adjustably supported in the seat tube 16 and carries a seat 18 at its upper end for accommodating a rider.

A pair of chain guards 19 extend rearwardly from the bracket assembly 15 and carry a wheel bracket 21 at their rear end. A rear wheel 22 is journaled for rotation on this wheel bracket 21 in any known manner.

A pair of back stays 23 extend upwardly and forwardly from the wheel bracket 21 and are connected to the upper end of the seat tube 16 to provide triangulation and strength for the frame assembly.

A front fork 24 is rotatably journaled in the head pipe 13. The front fork 24, in turn, rotatably journals a front wheel 25. A handlebar assembly 26 is affixed to the upper end of the front fork 24 for steering of the front wheel 25 by a rider seated on the seat 18 in a well-known manner.

The bracket assembly 15 further mounts a combined drive unit and control unit, indicated generally by the reference numeral 27. This is comprised of the drive unit 28 and a control unit 29. The drive unit 28 rotatably journals a crankshaft 31. The exposed ends of the crankshaft 31 each carry crank arms 32 with pedals 33 journaled at their outer extremities so as to provide a manual force input to the drive unit 28.

In addition, an electric motor power assist, indicated generally by the reference numeral 34 forms a part of the drive unit 28 and is operated in a manner which will be described so as to provide assist power for driving the rear wheel 22.

A battery box 35 is mounted on the frame assembly forwardly of the seat pipe 16 and above the bracket 15. This bracket box 35 contains a removable rechargeable battery 36 that supplies electric power for the motor 34 under the control of the controller 29. The battery 36 may be either charged in place or may be removed for charging, as is well known in this art.

Figure 2:
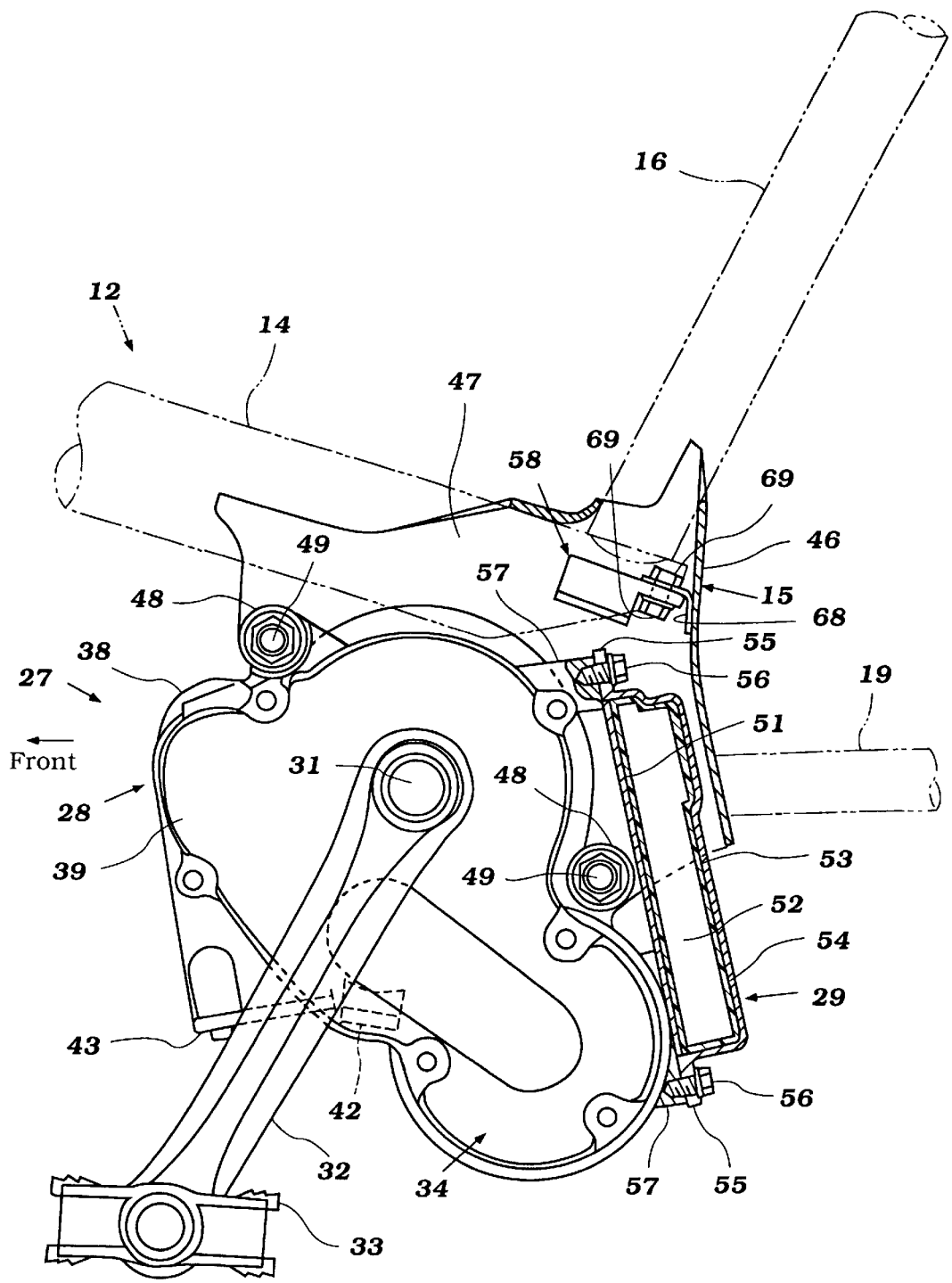
FIG. 2 is an enlarged side elevational view of the drive unit, control unit, and associated security unit showing portions of the vehicle in phantom and other portions broken away so as to more clearly show the construction.
Figure 3:
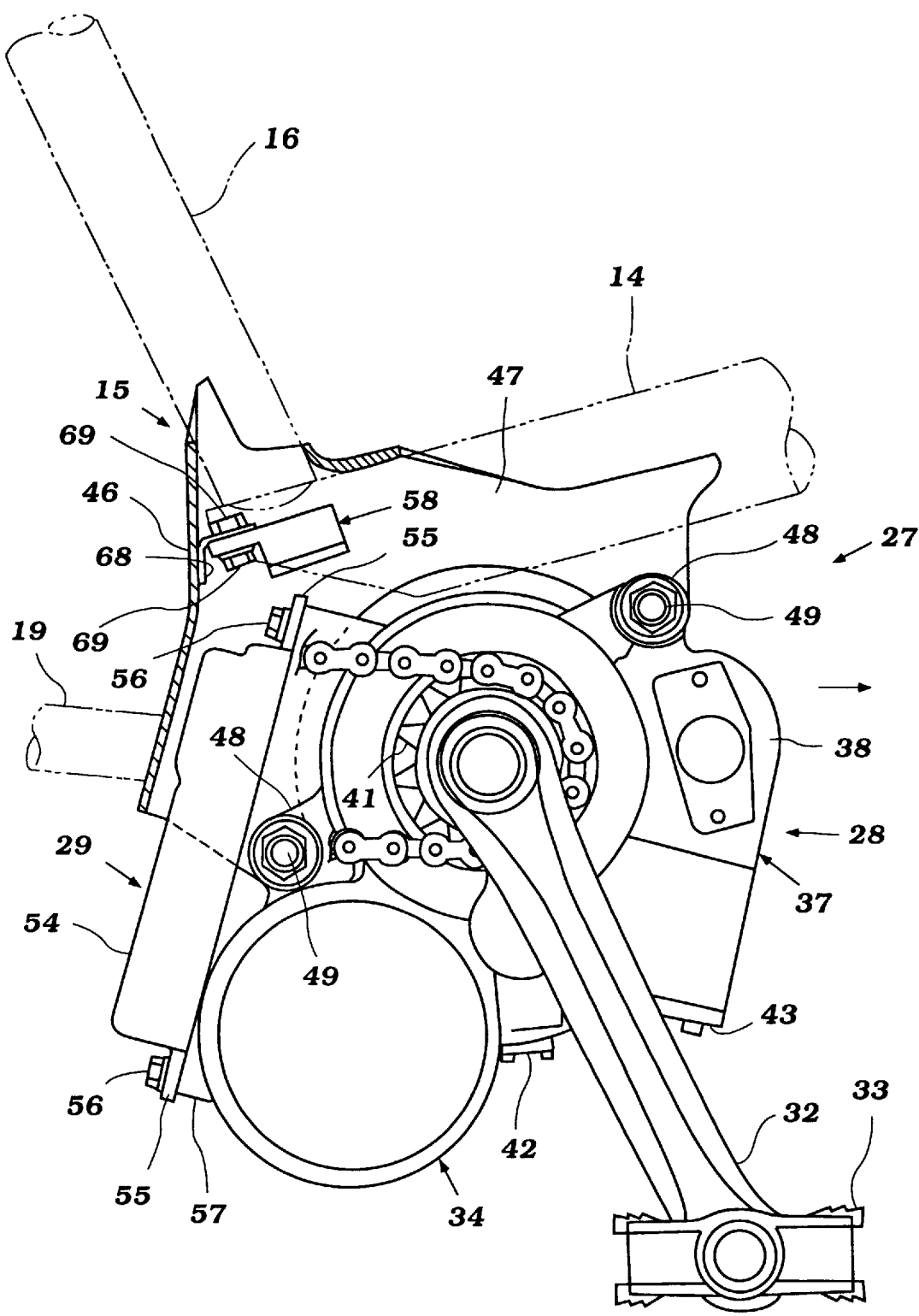
FIG. 3 is an enlarged side elevational view of the same components shown in FIG. 2 but looking in the opposite direction and also with portions broken away.
Figure 4:
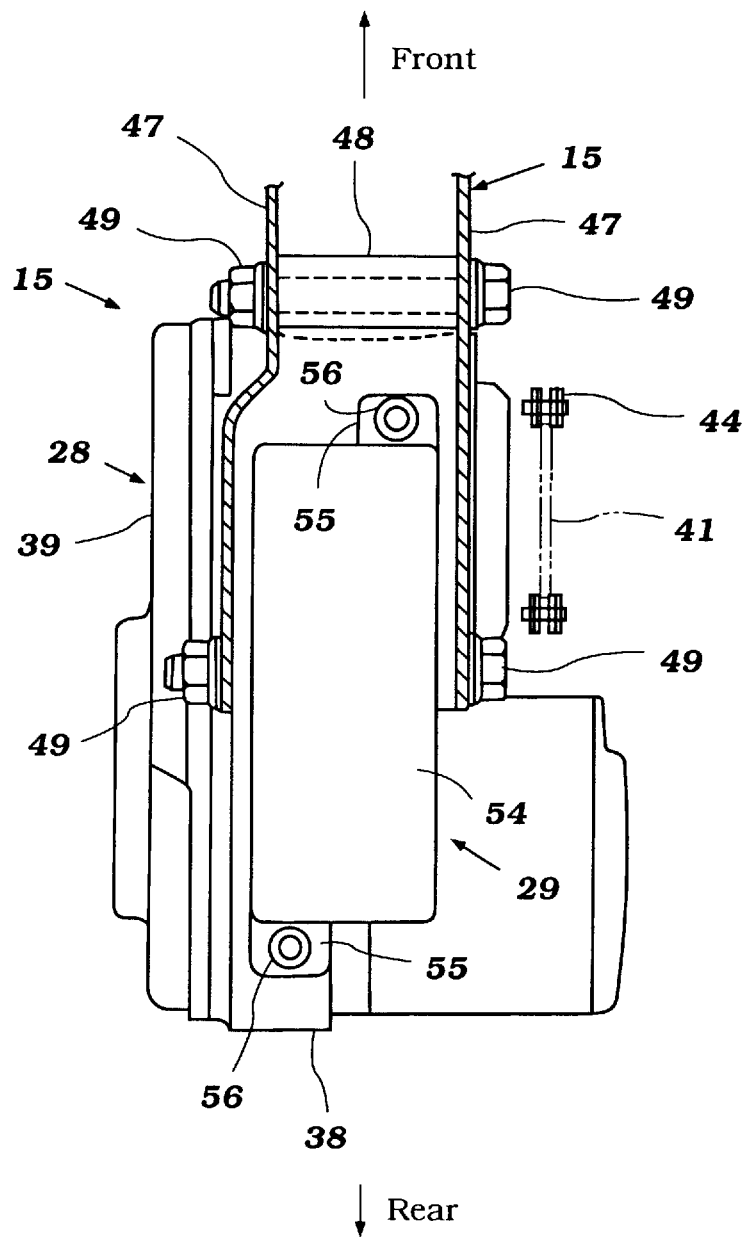
FIG. 4 is a top, plan view of the assembly shown in FIGS. 2 and 3 also with portions broken away.

Referring now primarily to FIGS. 2–4, the details of the mounting bracket 15 and drive unit 28 and control 29 will be described in more detail. As has been noted, the crankshaft 31 is rotatably journaled within the drive unit 28. This drive unit is comprised primarily of an outer housing assembly 37 that is comprised of a main housing piece 38 to which a cover plate 39 is affixed by threaded fasteners.

As has been previously noted, the electric assist motor 34 is also mounted on this housing assembly. The crankshaft 31 is driven by the pedals 33 and transmits drive to an output sprocket 41 through a step up transmission which may preferably be a planetary transmission and one-way clutch. The type of transmission shown in aforenoted U.S. Pat. No. 5,570,752 may be utilized for this purpose. Obviously, however, other types of arrangements can be employed.

In a like manner, the electric assist motor 34 drives the crankshaft 31 through a step down transmission, which also may be of the planetary type and through a one-way clutch. The one-way clutches are incorporated so that the manual operation of the crankshaft 31 will not necessarily cause rotation of the electric motor 34 and also so that the electric motor 34 will not drive the crank mechanism including the crank arms 32.

In order to provide the power assist it is dependent upon operator input force and limited as the speed increases, there are provided sensors for sensing both manual input torque and speed. These sensors are shown only in elevation with the speed sensor being indicated by the reference numeral 42 and the torque sensor being indicated by the reference numeral 43. Sensors of this type are also shown in the aforementioned U.S. Pat. No. 5,570,752.

The drive sprocket 41 is engaged by a drive chain 44 which, in turn, drives a driven sprocket 45 fixed to the rear wheel 22.

The mounting bracket 15 is comprised of a sheet metal member, that has a generally C-shape when viewed in top plan. This is comprised of a vertically-extending back wall 46 and a pair of forwardly-extending side walls 47. These walls partially enclose and embrace the outer housing 37. The outer housing 37 and more particularly its main body member 38 is formed with a pair of lugs 48. These lugs 48 pass threaded fasteners 49 for rigidly affixing the drive unit 28 in place on the bicycle 12.

The control unit 29 is comprised of a printed circuit board 51 on which discrete components 52 are mounted in conjunction with conductors formed on the board 51. The resulting assembly is then potted in a potting compound 53 and enclosed in a highly conductive metal case such as an aluminum case 54. This case 54 has tabs 55 that are apertured and which receive threaded fasteners 56 for affixation to lugs 57 formed on the main housing member 38. This places the control 29 in a protected position and yet permits air flow and good heat transfer from it to the atmosphere through the main housing assembly 37 of the drive unit 28.

As has been aforenoted, the controller 29 is programmed so as to provide a control strategy wherein the power assist for the bicycle 12 is varied. As a general example, the control strategy may be such that if the vehicle is being pedaled at a speed in the range of 0 to 15 km an hour, the assist ratio is approximately 1. As the speed exceeds 15 km an hour, the assist ratio gradually decays reaching 0 at a speed such as 24 km an hour. Over 24 km an hour, there will be no electric assist. Of course, these ratios can be varied so as to suit specific applications. Furthermore, the ratios would be varied to suit specific rider preferences and/or the characteristics of the bicycle such as the size of the wheels and specifically the rear wheel 22, the drive ratio between the sprockets 41 and 45, the length of the crank arms 32 and other factors.

Figure 5:
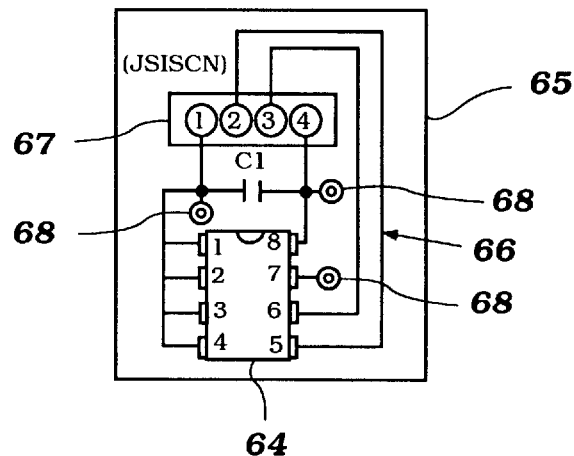
FIG. 5 is a partially schematic view showing the security device of the security unit.
Figure 6:
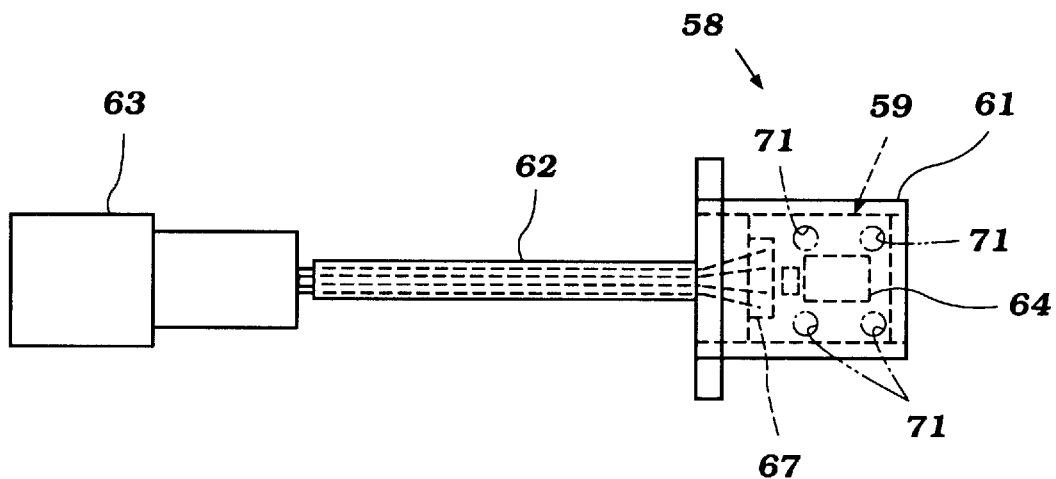
FIG. 6 is a view showing the complete security unit and associated wire harness and connector for connection to the control unit of the drive unit.
Figure 7:
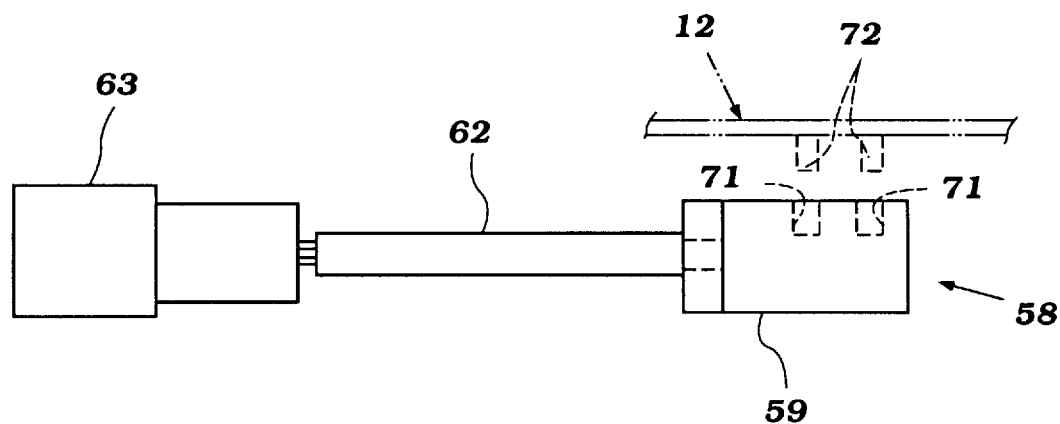
FIG. 7 is a view showing one way in which the security unit and wire harness may be mounted on a vehicle to further ensure security and avoid mismatching of the components.

The way this is accommodated will now be described by primary reference to FIGS. 5–9. Basically, the concept is to provide a security unit, indicated generally by the reference numeral 58 and which is shown in these figures. This security unit 58 includes a main security unit 59 which is shown in FIG. 5 and which is contained within an outer case 61 of the security unit (FIG. 6). This main security unit 59 is coupled via a wire harness 62 to a connector 63. The connector 63, in turn, plugs into the control unit 29 as shown schematically in FIG. 8.

Referring specifically to FIG. 5, the main security unit 59 is a device that is programmed and configured with a memory, indicated by the reference numeral 64 that is mounted on a board 65 and which is connected by wiring 66 to certain terminals. Preferably, the memory 64 is an EEPROM or flash memory for which stored data can be loaded. A connector 67 is also mounted on this board and there are provided programming probe terminals 68 which permit the verification of the operation of the device and which also permits data to be loaded to the memory 64. After their memory 64 is loaded with information, as will be described, then the entire device 59 is sealed in a potting compound such as a resin so as to disable the ability to reload the device subsequently.

The connector 67 is attached to the terminals of the wire harness 62 and the unit is placed into the outer housing 61.

Referring back to FIGS. 2 and 3, it may be seen that the security unit 58 is conveniently mounted on the bracket 15 prior to assembly of the drive unit 37 into the bracket. For this end, a mounting tab 68 is fixed to the bracket 15 and threaded fasteners 69 attach the main security unit 58 in place. When the drive unit 28 and attached controller 29 are brought into place, the wire harness 63 is connected to the control unit 29 and then the fasteners 49 are inserted so as to complete the assembly.

In order to provide security and insurance that the proper security unit 58 is attached to the proper control unit 29, the outer housing 61 of the security unit 58 may be formed with specific shaped and spaced apertures or recesses 71. These recesses 71 will mate with mating projections 72 formed on the mounting bracket or other component of the bicycle 12 within the bracket structure 15.

Figure 8:
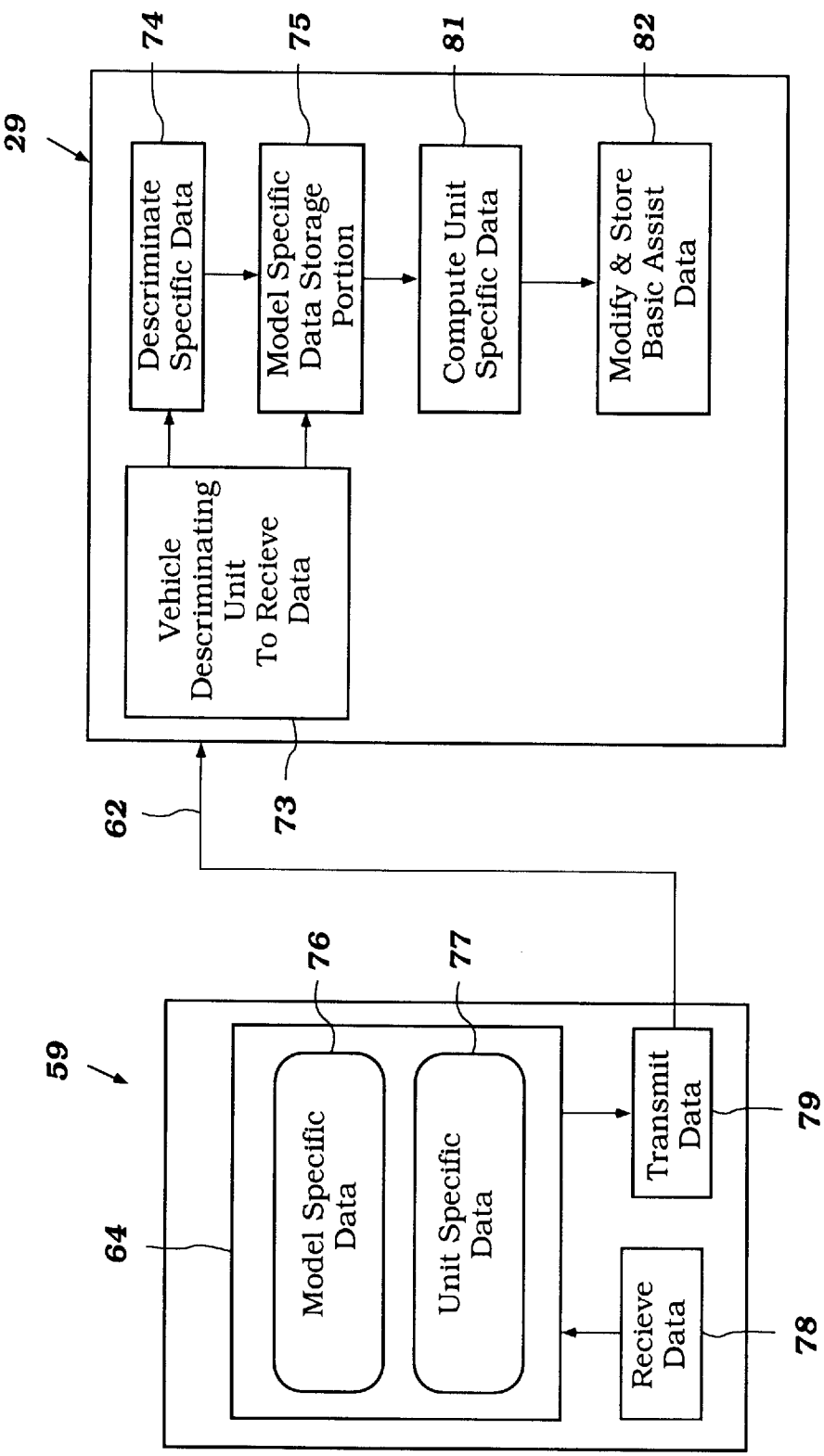
FIG. 8 is a block diagram showing schematically how the security unit and control unit cooperate.
Figure 9:
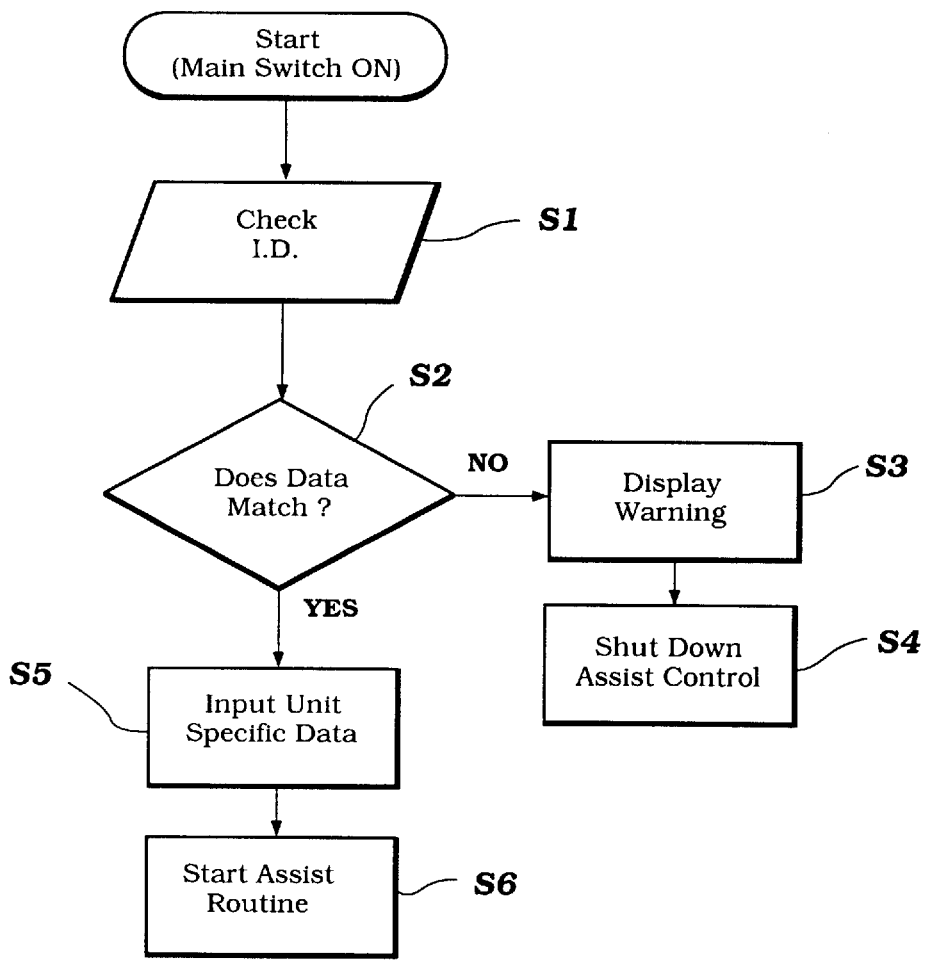
FIG. 9 is a block view showing the control routine for operation of the vehicle.

The security and control strategy will now be described by reference to FIGS. 8 and 9. The control unit 29, as seen in FIG. 8, is configured so that it will be capable of providing control signals to the electric motor 34 in response to the various sensed signals and to suit the specific vehicle application and, if desired, specific rider specification. To this end, the control unit has a data receiving function station 73 that receives data from the security unit 58 through the wire harness 62. This data is transmitted to a discriminating unit 74 that compares the output data from the memory 64 of the security unit 58 with the specific information section 75 which is programmed at installation to identify information such as the vehicle type, specific identification number, data of manufacture, product serial number. Matching information is stored in the memory 64 and specifically a specific information section 76 thereof prior to the potting and through the probe terminals 68 in the manner aforedescribed.

In addition to this information, a further memory section 77 of the security unit 58 contains unit specific data with respect to the particular vehicle as ordered by the customer, such as crank lever length, tire diameter, gear ratios, etc. This data is inserted through an insertion selection 78 and transmitted through a transmitting section 79. Thus, when the wire harness 62 is coupled to the controller 29, the data can be transmitted.

The controller 29 in addition to the discriminating section 74 and model specific storage section 75 also includes a section 81 that can compute data for each model of the type employed and then based upon the information from the security unit 58 modify and store the basic assist data in a section 82 for the control strategy for the applied vehicle and operator selected parameters.

Each time the vehicle is operated and the main switch turned on, verification is made that the security unit 58 and control unit 29 are matched. This is done by the control routine shown in FIG. 9.

When the main switch is turned on, the program moves to the step S1 wherein the discriminating section 74 determines if the main vehicle identification information in the section 76 of the controller coincides with that of the vehicle in the controller section 75. At the step S2, it is determined if this matching is proper.

If it is not, the program moves to the step S3 so as to display a warning and to the step S4 so as to disable electric power assist.

If, however, at the step S2, the data matches, then the program moves to the step S5 so as to transmit the specific model data from the section 77 of the security unit 58 to the controller sections 81 and 82 and then the assist program can start at the step S6, in accordance with the appropriate control routine.

Thus, from the foregoing description it should be readily apparent that this device permits the utilization of a wide variety of control strategies only through changing the security unit and the initial programming of the control unit 29. If replacement becomes necessary, it will be ensured that an appropriate unit is employed and it must be programmed with the appropriate information.

From the foregoing description it should be readily apparent to those skilled in the art that the described embodiment of the invention is very effective in providing good control and security. It should be apparent to those skilled in the art that the foregoing description, however, is that of a preferred embodiment of the invention and that various changes and modifications may be made without departing from the spirit and scope of the invention, as defined by the appended claims.

I claim:

1. A security system for an electric motor assisted manually powered vehicle, said system comprising a power unit having a manual force input and an electric motor force input, a transmission for driving an output for propelling a vehicle from said inputs, and a controller for controlling the operation of said electric motor for controlling the amount of electric motor assist, said controller being programmed with certain identifying information, and a security unit for controlling the communication of electric power to said controller, said security unit having information which must be matched with information in said controller in order for said controller to be operative to effect electric power assist.

2. A security system as set forth in claim 1, wherein the controller is operative to be programmed with information specific to identify a particular vehicle and model year and wherein the security unit is programmed with like information.

3. A security system as set forth in claim 2, wherein the security unit is also programmed with model specific information from information based on specific model information chosen by a user of the model and the controller controls the electric motor assist in response to such information.

4. A security system as set forth in claim 1, wherein the security unit is also programmed with model specific information from information based on specific model information chosen by a user of the model and the controller controls the electric motor assist in response to such information.

5. A security system as set forth in claim 1, wherein the controller is capable of providing a variety of electric power assist modes and the selected electric motor assist mode is controlled by the security unit.

6. A security system as set forth in claim 5, wherein the controller is operative to be programmed with information specific to identify a particular vehicle and model year and wherein the security unit is programmed with like information.

7. A security system as set forth in claim 6, wherein the security unit is also programmed with model specific information from information based on specific model information chosen by a user of the model and the controller controls the electric motor assist in response to such information.

8. A security system as set forth in claim 5, wherein the security unit is also programmed with model specific information from information based on specific model information chosen by a user of the model and the controller controls the electric motor assist in response to such information.

9. A security system as set forth in claim 1, wherein the security unit is comprised of a sealed memory preloaded with the data and sealed in a resin.

10. A security system as set forth in claim 9, wherein the security unit is preloaded through probes.

11. A security system as set forth in claim 1, in combination with a vehicle and wherein the security unit and vehicle have mating surfaces configured to match the specific power unit fitted to the vehicle.

* * * * *